(12) United States Patent  
Han (10) Patent No.: US 8,724,986 B2
(45) Date of Patent: May 13, 2014

(54) METHOD FOR TRANSMITTING IMPAIRMENT INFORMATION, NODE, AND NETWORK SYSTEM

(75) Inventor: Jianrui Han, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 374 days.

(21) Appl. No.: 13/311,084

(22) Filed: Dec. 5, 2011

(65) Prior Publication Data

US 2012/0076490 A1  Mar. 29, 2012

Related U.S. Application Data

(63) Continuation of application No. PCT/CN2010/073554, filed on Jun. 4, 2010.

(30) Foreign Application Priority Data

Jun. 5, 2009  (CN) .......................... 2009 1 0107687

(51) Int. Cl.
*H04B 10/00* (2013.01)

(52) U.S. Cl.
USPC ......................................................... 398/17

(58) Field of Classification Search
USPC ............................................................ 398/17
See application file for complete search history.

(56) References Cited

U.S. PATENT DOCUMENTS

| | | | |
|---|---|---|---|
| 6,201,842 B1* | 3/2001 | Kim ............................. | 375/346 |
| 6,314,163 B1* | 11/2001 | Acampora ................... | 379/56.2 |
| 6,538,778 B1* | 3/2003 | Leckel et al. ............... | 398/25 |
| 7,092,633 B2* | 8/2006 | Fumagalli et al. .......... | 398/59 |
| 7,149,425 B2* | 12/2006 | Gripp et al. ................. | 398/34 |
| 7,362,974 B2* | 4/2008 | De Patre et al. ............ | 398/50 |
| 7,623,785 B2* | 11/2009 | Krishnaswamy et al. ... | 398/58 |
| 7,848,648 B2* | 12/2010 | Kusama ....................... | 398/45 |
| 8,081,881 B2* | 12/2011 | Oki et al. .................... | 398/175 |

(Continued)

FOREIGN PATENT DOCUMENTS

| CN | 101075956 A | 11/2007 |
|---|---|---|
| CN | 101374107 A | 2/2009 |

(Continued)

OTHER PUBLICATIONS

Martinelli et al., "GMPLS Signaling Extensions for Optical Impairment Aware Lightpath Setup" The IETF, Feb. 2008.

(Continued)

*Primary Examiner* — Danny Leung
(74) *Attorney, Agent, or Firm* — Leydig, Voit & Mayer, Ltd.

(57) ABSTRACT

The embodiments of the present invention relate to the field of communication technologies, and disclose a method for transmitting impairment information, a node, and a network system. The method for transmitting impairment information includes: receiving, by a first node on a path, first impairment information from a previous hop node, and updating the first impairment information to obtain physical impairment parameters of all or a part of available wavelengths at the first node; deleting a wavelength whose physical impairment parameter at the first node exceeds a preset range; and sending second impairment information to a next hop node of the first node when a residual wavelength still exists after the wavelength whose impairment parameter exceeds the preset range is deleted. The second impairment information includes a physical impairment parameter of the residual wavelength at the first node.

12 Claims, 6 Drawing Sheets

(56) References Cited

U.S. PATENT DOCUMENTS

| | | | |
|---|---|---|---|
| 8,090,256 B2* | 1/2012 | Reisslein et al. ............... | 398/3 |
| 8,244,127 B2* | 8/2012 | Sadananda et al. ............ | 398/29 |
| 2002/0191247 A1* | 12/2002 | Lu et al. ...................... | 359/124 |
| 2006/0251156 A1* | 11/2006 | Grant et al. .................. | 375/148 |
| 2009/0274464 A1* | 11/2009 | Zi et al. ........................ | 398/79 |
| 2009/0304380 A1* | 12/2009 | Sadananda et al. ............ | 398/26 |
| 2010/0220996 A1* | 9/2010 | Lee et al. ..................... | 398/25 |
| 2010/0239246 A1* | 9/2010 | Taylor et al. ................. | 398/34 |

FOREIGN PATENT DOCUMENTS

| | | |
|---|---|---|
| CN | 101415130 A | 4/2009 |
| WO | WO 2006048414 A1 | 5/2006 |
| WO | WO 2010139282 A1 | 12/2010 |

OTHER PUBLICATIONS

Martinez et al., "Challenges and Requirements for Introducing Impairment-Awareness into the Management and Control Planes of ASON/GMPLS WDM Networks", IEEE Communications Magazine, Dec. 2006.

Written Opinion of the International Searching Authority (translation) dated (mailed) Sep. 9, 2010, issued in related Application No. PCT/CN2010/073554, filed Jun. 4, 2010, Huawei Technologies Co., Ltd.

International Search Report dated (mailed) Sep. 9, 2010, issued in related Application No. PCT/CN2010/073554, filed Jun. 4, 2010, Hauwei Technologies Co., Ltd.

Search Report in corresponding Chinese Patent Application No. 200910107687.8 (Mar. 25, 2013).

* cited by examiner

METHOD FOR TRANSMITTING IMPAIRMENT INFORMATION, NODE, AND NETWORK SYSTEM

CROSS-REFERENCE TO RELATED APPLICATIONS

This application is a continuation of International Application No. PCT/CN2010/073554, filed on Jun. 4, 2010, which claims priority to Chinese Patent Application No. 200910107687.8, filed on Jun. 5, 2009, both of which are hereby incorporated by reference in their entireties.

FIELD OF THE INVENTION

The present invention relates to the field of communication technologies, and in particular, to a method for transmitting impairment information, a node, and a network system.

BACKGROUND OF THE INVENTION

A wavelength division multiplex (Wavelength Division Multiplex, WDM) optical network is capable of performing multiplexing, transmission, amplification, route selection, and restoration on a signal in an optical domain, which has become a study hotspot in a field of optical communications. According to that whether a node of a WDM optical network performs electronic processing on an optical signal, optical networks may be divided into two types: a transparent (Transparent) network and an opaque (Opaque) network. For a transparent optical network, a signal is in a form of an optical signal all the way in a process of being transmitted from a source node to a destination node, and regeneration, exchange and wavelength conversion of the signal are completed in an optical domain. Since the node is incapable of regenerating an electric signal, the transparent optical network is essentially an analogue transport network. Since each network unit does not perform electric processing on an optical signal, information impairment cannot be eliminated in a transmission process. Therefore, transparency of the WDM may cause performance degradation of a transmitted optical signal, which may become severer as a network scale expands and a transmission distance increases. Performance factors that may affect performance of an optical signal include: optical fiber dispersion, optical fiber nonlinearity, crosstalk (especially inter-band crosstalk), and erbium doped fiber amplifier (Erbium Doped Fiber Amplifier, EDFA) noise integration.

In a WDM Network, after a group of connection requests are given, routes need to be established and wavelengths need to be assigned for the connection requests, and this is referred to as a problem of routing and wavelength assignment (RWA, Routing and wavelength assignment). Apart from the RWA, when establishing an optical path connection in a WDM transparent optical network, the mentioned performance factors also need to be considered to ensure that an established optical path can normally bear transmission of a signal. The performance factors are called physical impairment. Two solutions that are adopted to implement transmission control based on the physical impairment include a centralized solution and a distributed solution. In the former solution, an independent centralized control unit is responsible for routing and wavelength assignment, and performance assessment and parameter calculation. In the latter solution, more flexible performance control is implemented by expanding a control plane protocol.

In a distributed control mode, a transport network expands the control plane protocol to implement distributed transmission control, which includes a solution of a distributed signaling manner.

In the distributed signaling manner, the transport network expands signaling to implement online dynamic estimation of optical signal quality and physical parameter adjustment in a procedure of establishing an optical path. In this manner, a current routing protocol does not need to be altered, and each node only needs to store a local information database. By introducing an object that includes a network physical transmission parameter into a multi-protocol label switching protocol, when a path establishment request is received, a source node performs source routing calculation, and then signaling collects physical parameters of each node, an associated link, and an adjustable device from the source node to a destination node. An optical path assessment module is introduced at a destination end and performs assessment on performance of an optical path with reference to the physical parameters. If calculated transmission impairment does not exceed a tolerable range, a node establishes a connection and at the same time returns a response message to the source node. In a returning process, transmission equipment is reset according to an optical path assessment result. The distributed signaling manner does not require global flooding of physical parameter information of any link, but merely collects physical parameter information of each node and link through which the signaling passes in a path establishment message, and a path assessment module of the destination node performs judgment and calculation. The main advantages of the distributed signaling manner lie in that a network resource may be saved and a problem of communication synchronization may be avoided.

In an existing distributed signaling method, performance of an optical path is assessed at a destination end. Specific assessment manners are mainly divided into two kinds: The first is that a head node does not designate a wavelength during calculation of source routing, signaling carries physical impairment parameters of multiple wavelengths (wavelength set) along the way, and one of the wavelengths is selected at a tail node as an assigned wavelength of the path establishment request according to the physical impairment parameters of the multiple wavelengths; and the second is that a head node designates a wavelength during calculation of source routing, signaling carries a physical impairment parameter of the wavelength along the way; and whether the physical impairment parameter of the wavelength satisfies a requirement is verified at a tail node, and if the physical impairment parameter of the wavelength does not satisfy the requirement, the head node is instructed to re-select a path or a wavelength.

The existing solutions put forward that impairment assessment is performed at a tail node. This processing manner causes that the tail node receives too many physical impairment parameters of wavelengths, so that the amount of redundant information is quite large, and at the same time, a path establishment delay is increased.

SUMMARY OF THE INVENTION

Embodiments of the present invention provide a method for transmitting impairment information, a node, and a system, which may reduce the amount of redundant information and shorten a path establishment delay.

An embodiment of the present invention provides a method for transmitting impairment information, which includes:

receiving, by a first node on a path, first impairment information from a previous hop node of the first node, where the first impairment information includes a physical impairment parameter of one or more available wavelengths at the previous hop node;

updating, by the first node, the first impairment information, where physical impairment parameters of all or apart of available wavelengths of the one or more available wavelengths at the previous hop node are updated to physical impairment parameters of the all or a part of available wavelengths at the first node, where the physical impairment parameters of the all or a part of available wavelengths of the one or more available wavelengths at the previous hop node are included in the first impairment information;

judging, by the first node, whether the physical impairment parameters of the all or a part of available wavelengths at the first node exceed a preset range;

when the all or a part of available wavelengths include a wavelength whose physical impairment parameter at the first node exceeds the preset range, deleting the wavelength whose physical impairment parameter at the first node exceeds the preset range; and when the all or a part of available wavelengths still include a residual wavelength after deleting the wavelength whose physical impairment parameter at the first node exceeds the preset range, sending, by the first node, second impairment information to a next hop node of the first node, where the second impairment information includes a physical impairment parameter of the residual wavelength at the first node.

An embodiment of the present invention provides a node, which includes:

an updating module, configured to receive first impairment information from a previous hop node of a current node, where the first impairment information includes a physical impairment parameter of one or more available wavelengths at the previous hop node; and update the first impairment information, where physical impairment parameters of all or a part of available wavelengths of the one or more available wavelengths at the previous hop node are updated to physical impairment parameters of the all or a part of available wavelengths at the current node, where the physical impairment parameters of the all or a part of available wavelengths of the one or more available wavelengths at the previous hop node are included in the first impairment information;

a deleting module, configured to judge whether the physical impairment parameters of the all or a part of available wavelengths at the current node exceed a preset range; and when the all or a part of available wavelengths include a wavelength whose physical impairment parameter at the current node exceeds the preset range, delete the wavelength whose physical impairment parameter at the current node exceeds the preset range; and a sending module, configured to send second impairment information to a next hop node of the current node when the all or a part of available wavelengths still include a residual wavelength after deleting the wavelength whose physical impairment parameter at the current node exceeds the preset range, where the second impairment information includes a physical impairment parameter of the residual wavelength at the current node.

An embodiment of the present invention provides a network system, which includes a first node, a previous hop node of the first node, and a next hop node of the first node, where the first node is configured to: receive first impairment information from the previous hop node of the first node; where the first impairment information includes a physical impairment parameter of one or more available wavelengths at the previous hop node;

update the first impairment information, where physical impairment parameters of all or a part of available wavelengths of the one or more available wavelengths at the previous hop node are updated to physical impairment parameters of the all or a part of available wavelengths at the first node, where the physical impairment parameters of the all or a part of available wavelengths of the one or more available wavelengths at the previous hop node are included in the first impairment information;

judge whether the physical impairment parameters of the all or a part of available wavelengths at the first node exceed a preset range;

when the all or a part of available wavelengths include a wavelength whose physical impairment parameter at the first node exceeds the preset range, delete the wavelength whose physical impairment parameter at the first node exceeds the preset range; and when the all or a part of available wavelengths still include a residual wavelength after deleting the wavelength whose physical impairment parameter at the first node exceeds the preset range, send second impairment information to the next hop node of the first node, where the second impairment information includes a physical impairment parameter of the residual wavelength at the first node.

Through the technical solutions described in the embodiments of the present invention, when available wavelengths received by a first node include a wavelength whose physical impairment parameter exceeds a preset range, the wavelength is deleted and a physical impairment parameter of a residual wavelength is sent to a next hop node through second impairment information, so as to avoid a situation that when a physical impairment parameter of an available wavelength no longer meets a requirement of a physical impairment parameter threshold, impairment information of the available wavelength is still carried to a destination node, and therefore, the amount of redundant information may be reduced and a path establishment delay may be shortened.

BRIEF DESCRIPTION OF THE DRAWINGS

In order to make the technical problem to be solved, adopted technical solutions and advantages of the present invention clearer, the present invention is further described in detail in the following embodiments with reference to the accompanying drawings. It should be understood that all the drawings are not necessarily drawn in proportion, and are not intended to limit the present invention. In each drawing.

DETAILED DESCRIPTION OF THE EMBODIMENTS

The technical solutions of the present invention are further described with reference to specific embodiments in the following.

To facilitate description, definitions and functions of messages involved in embodiments of the present invention are briefly described here first. The description here is merely a common meaning, where if the description is improper, globally accepted norms shall be subjected to. This does not form a limitation to the present invention.

Figure 1:
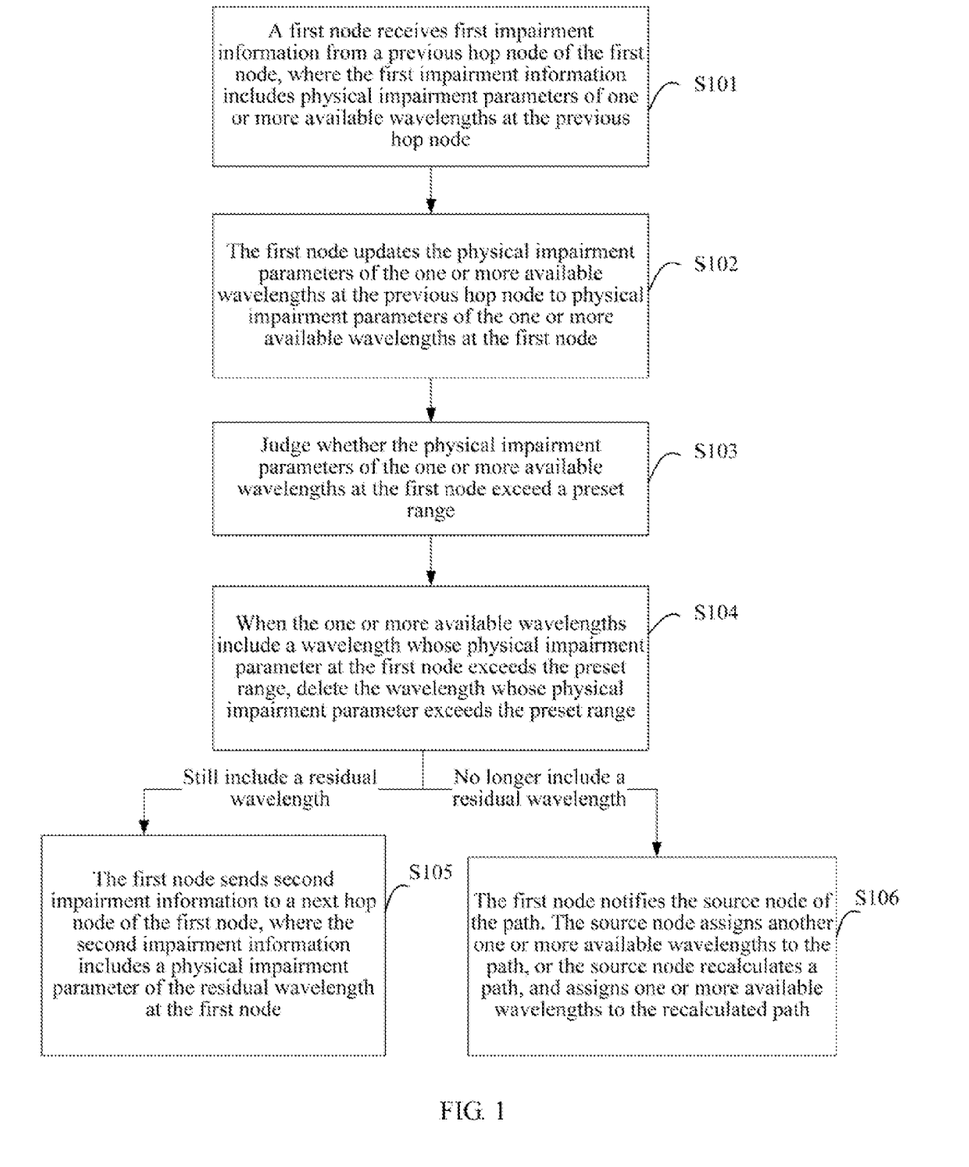
FIG. 1 is a flow chart of a method for transmitting impairment information according to a first embodiment of the present invention.

FIG. 1 is a flow chart of a method for transmitting impairment information according to a first embodiment of the present invention. As shown in the following:

S101: A first node on a path receives first impairment information from a previous hop node of the first node, where the first impairment information includes a physical impairment parameter of one or more available wavelengths at the previous hop node.

In this step, the physical impairment parameter may be a physical impairment parameter that cannot be subsequently compensated, such as an OSNR parameter.

In this embodiment, the first node is an intermediate node between a source node and a destination node on the path. The previous hop node of the first node may be another intermediate node. The previous hop node of the first node may also be the source node of the path. When the previous hop node of the first node is the source node of the path, the one or more available wavelengths are assigned by the source node.

S102: The first node updates the first impairment information, where physical impairment parameters of all or a part of available wavelengths of the one or more available wavelengths at the previous hop node are updated to physical impairment parameters of the all or a part of available wavelengths at the first node, where the physical impairment parameters of the all or a part of available wavelengths of the one or more available wavelengths at the previous hop node are included in the first impairment information.

The first node stores a physical impairment value between the previous hop node and the first node, and a physical impairment value of the first node. The first node updates the physical impairment parameters of the all or a part of available wavelengths of the one or more available wavelengths at the previous hop node to the physical impairment parameters of the all or a part of available wavelengths at the first node according to the physical impairment value between the previous hop node and the first node, and the physical impairment value of the first node.

In an optional situation, the first node updates the physical impairment parameter of the one or more available wavelengths at the previous hop node to an intermediate physical impairment parameter of the one or more available wavelengths according to the physical impairment value between the previous hop node and the first node. The first node updates the intermediate physical impairment parameter of the one or more available wavelengths to the physical impairment parameter of the one or more available wavelengths at the first node according to the physical impairment value of the first node. The intermediate physical impairment parameters are impairment parameters of the one or more available wavelengths, where the impairment parameters of the one or more available wavelengths are obtained by the first node after updating the physical impairment parameter of the one or more available wavelengths at the previous hop node according to the physical impairment value between the previous hop node and the first node.

In another optional situation, the first node updates the physical impairment parameter of the one or more available wavelengths at the previous hop node to an intermediate physical impairment parameter of the one or more available wavelengths according to the physical impairment value between the previous hop node and the first node. The first node judges whether the intermediate physical impairment parameter of the one or more available wavelengths exceed a preset range. When the one or more available wavelengths include a wavelength whose intermediate physical impairment parameter exceeds the preset range, the wavelength whose intermediate physical impairment parameter exceeds the preset range is deleted to obtain wavelengths whose intermediate physical impairment parameters fall within the preset range. According to the physical impairment value of the first node, the intermediate physical impairment parameters of the wavelengths whose intermediate physical impairment parameters fall within the preset range are updated to physical impairment parameters of the wavelengths at the first node, where the intermediate physical impairment parameters of the wavelengths fall within the preset range. In this situation, a part of available wavelengths of the one or more available wavelengths are the wavelengths whose intermediate physical impairment parameters fall within the preset range.

S103: The first node judges whether the physical impairment parameters of the all or a part of available wavelengths at the first node exceed a preset range.

In this step, the preset range represents a permitted range of the physical impairment parameters when a signal transmitted on the all or a part of available wavelengths on the path satisfies a signal quality requirement.

S104: When the all or a part of available wavelengths include a wavelength whose physical impairment parameter at the first node exceeds the preset range, the first node deletes the wavelength whose physical impairment parameter at the first node exceeds the preset range.

Step 105: When a residual wavelength still exists after the wavelength deletion, the first node sends second impairment information to a next hop node of the first node, where the second impairment information includes a physical impairment parameter of the residual wavelength at the first node.

In this step, the next hop node of the first node may be another intermediate node, and may also be the destination node. When the next hop node of the first node is the destination node, after the first node sends the second impairment information to the destination node, the destination node updates the physical impairment parameter of the residual wavelength at the first node to a physical impairment parameter of the residual wavelength at the destination node, judges whether the physical impairment parameter of the residual wavelength at the destination node exceeds the preset range, and when the residual wavelength includes a wavelength whose physical impairment parameter does not exceed the preset range, determines a wavelength from the wavelength whose physical impairment parameter does not exceed the preset range as a wavelength used for establishing a path.

The technical solution in the first embodiment of the present invention may further include:

S106: When the all or a part of available wavelengths no longer include a residual wavelength after the wavelength deletion, the first node notifies the source node of the path. The source node assigns another one or more available wavelengths to the path, or the source node recalculates a path, and assigns one or more available wavelengths to the recalculated path.

Through the technical solution described in this embodiment of the present invention, when available wavelengths received by a first node include a wavelength whose physical impairment parameter exceeds a preset range, the wavelength is deleted and a physical impairment parameter of a residual wavelength is sent to a next hop node through second impairment information, so as to avoid a situation that when a physical impairment parameter of an available wavelength no longer meets a requirement of a physical impairment parameter threshold, impairment information of the available wavelength is still carried to a destination node, and therefore, the amount of redundant information may be reduced and a path establishment delay may be shortened.

Figure 2:
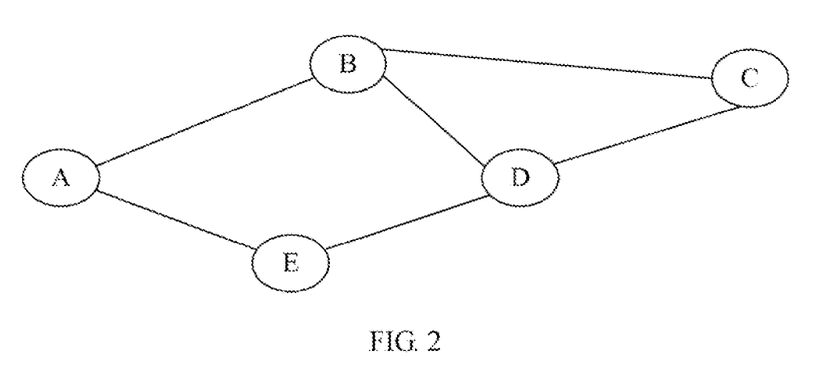
FIG. 2 is a network topology diagram adopting a method for transmitting impairment information according to an embodiment of the present invention.
Figure 3:
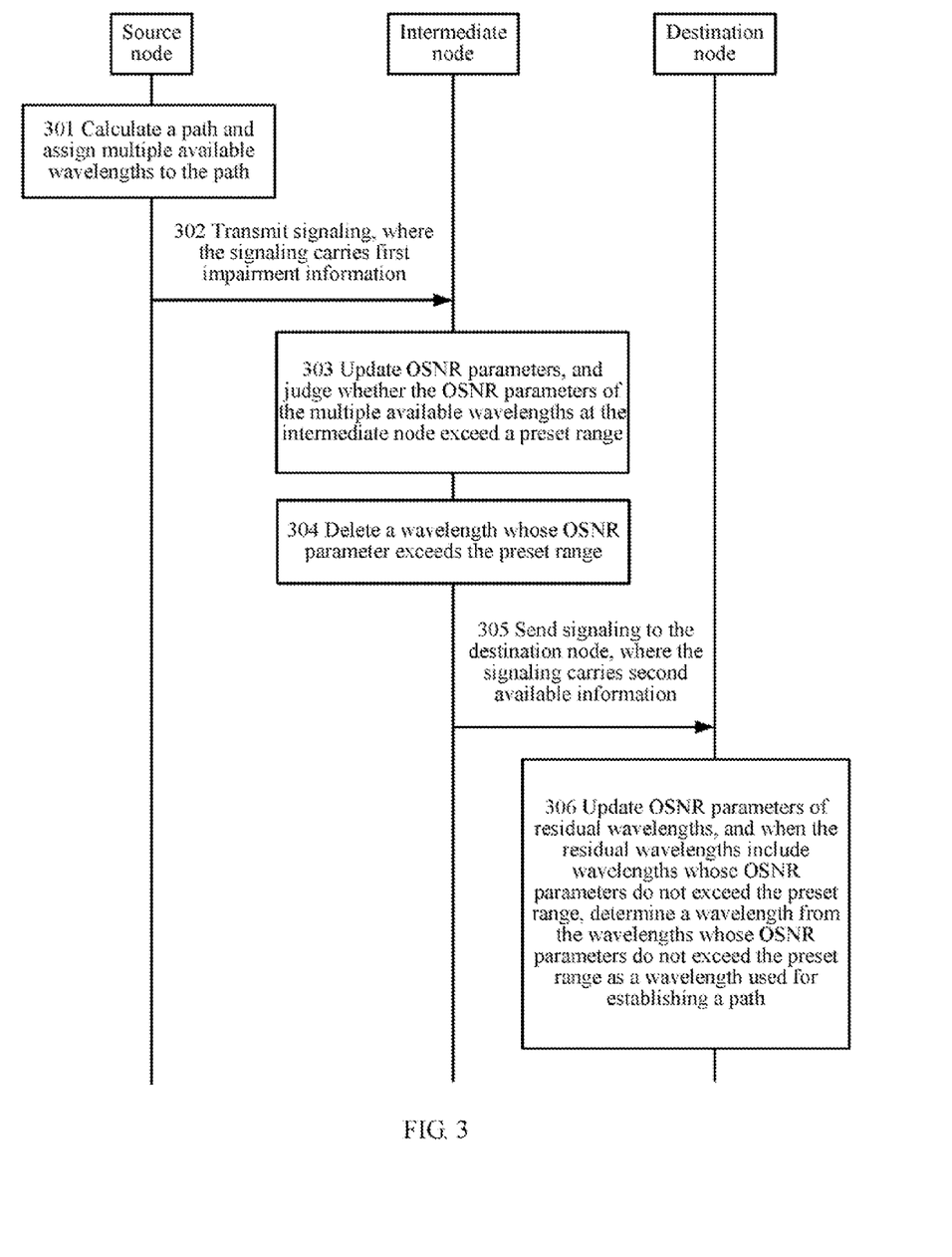
FIG. 3 is a flow chart of a method for transmitting impairment information according to a second embodiment of the present invention.

FIG. 2 is a network topology diagram adopting a method for transmitting impairment information according to a second embodiment of the present invention. The diagram includes five nodes: A, B, C, D, and E. FIG. 3 is a flow chart of a method for transmitting impairment information according to the second embodiment of the present invention. By taking an example that a source node is A, a destination node is C, and an optical signal noise ratio parameter serves as a physical impairment parameter, the method is described as follows with reference to FIG. 2, which includes:

S301: A source node calculates a path according to a network topology condition, and assigns multiple available wavelengths including $\lambda 1$, $\lambda 5$, $\lambda 6$, and $\lambda 13$ to the path.

In this step, a source node A calculates a path A-B-C according to the network topology condition, and assigns the available wavelengths including $\lambda 1$, $\lambda 5$, $\lambda 6$, and $\lambda 13$ to the path.

Step 302: The source node sends out signaling and transmits the signaling along the path. The signaling carries first impairment information. The first impairment information includes optical signal noise ratio (Optical Signal Noise Ratio, OSNR) parameters of the assigned $\lambda 1$, $\lambda 5$, $\lambda 6$, and $\lambda 13$ at the source node.

Since the OSNR parameters decrease in a transmission process along the path, an OSNR parameter of a wavelength at a source node is larger than an OSNR parameter of the wavelength at an intermediate node of a next hop of the source node. Similarly, an OSNR parameter of a wavelength at a destination node is smaller than an OSNR parameter of the wavelength at an intermediate node of a previous hop of the destination node. The decrease of the OSNR parameter in the transmission process along the path is determined by a characteristic of optical transmission, which is not described in detail here.

In this step, the source node A sends out signaling and transmits the signaling along the path A-B-C. The signaling carries first impairment information. The first impairment information includes OSNR parameters of $\lambda 1$, $\lambda 5$, $\lambda 6$, and $\lambda 13$ at the source node A.

Step 303: The intermediate node of the next hop of the source node receives the signaling, updates the first impairment information, where the OSNR parameters of the $\lambda 1$, $\lambda 5$, $\lambda 6$, and $\lambda 13$ at the source node are updated to OSNR parameters of the $\lambda 1$, $\lambda 5$, $\lambda 6$, and $\lambda 13$ at the intermediate node, where the OSNR parameters of the $\lambda 1$, $\lambda 5$, $\lambda 6$, and $\lambda 13$ at the source node are included in the first impairment information, and judges whether the OSNR parameters of the $\lambda 1$, $\lambda 5$, $\lambda 6$, and $\lambda 13$ at the intermediate node exceed a preset range.

In this step, since OSNR parameters decrease in the transmission process along the path, an OSNR parameter of one or more available wavelengths after light of the wavelength reaches the intermediate node at the next node of the source node are smaller than the OSNR parameter when the light of the wavelength is sent out at the source node, where the OSNR parameter of the one or more available wavelengths is carried in the first impairment information. The intermediate node of the next hop of the source node stores an OSNR impairment value between the source node and the intermediate node, and further stores an OSNR impairment value of the intermediate node. The intermediate node updates the OSNR parameters of the $\lambda 1$, $\lambda 5$, $\lambda 6$, and $\lambda 13$ at the source node A, where the OSNR parameters of the $\lambda 1$, $\lambda 5$, $\lambda 6$, and $\lambda 13$ at the source node A are included in the first impairment information, to the OSNR parameters of the $\lambda 1$, $\lambda 5$, $\lambda 6$, and $\lambda 13$ at the intermediate node according to the OSNR impairment value between the source node and the intermediate node, and the OSNR impairment value of the intermediate node.

It is assumed that the preset range in this embodiment is not less than 14 db, which represents that a permitted minimum value of the OSNR parameter on the path is 14 db when a signal transmitted on a wavelength on the path satisfies a signal quality requirement.

In this step, a node B receives the signaling, updates the OSNR parameters of the $\lambda 1$, $\lambda 5$, $\lambda 6$, and $\lambda 13$ at the source node A, where the OSNR parameters of the $\lambda 1$, $\lambda 5$, $\lambda 6$, and $\lambda 13$ at the source node A are included in the first impairment information, to OSNR parameters of the $\lambda 1$, $\lambda 5$, $\lambda 6$, and $\lambda 13$ at the node B according to an OSNR impairment value between the source node A and the node B, and an OSNR impairment value of the node B. In this step, the OSNR parameters of the $\lambda 1$, $\lambda 5$, $\lambda 6$, and $\lambda 13$ at the node B are respectively: OSNR ($\lambda 1$)=20 db, OSNR ($\lambda 5$)=13 db, OSNR ($\lambda 6$)=13 db, and OSNR ($\lambda 13$)=20 db. At this time, the node B judges that OSNRs of the two wavelengths $\lambda 5$, $\lambda 6$ exceed the preset range, where OSNR=20 db represents that the OSNR parameter of the $\lambda 1$ is 20 db, and the rest can be understood in the same manner.

S304: When the $\lambda 1$, $\lambda 5$, $\lambda 6$, and $\lambda 13$ include a wavelength whose physical impairment parameter at the intermediate node of the next hop of the source node exceeds the preset range, the intermediate node of the next hop of the source node deletes the wavelength whose physical impairment parameter exceeds the preset range.

In this step, the node B deletes the two wavelengths $\lambda 5$ and $\lambda 6$ from the available wavelengths.

S305: When only one intermediate node is located between the source node and the destination node, the intermediate node sends signaling to the destination node. The signaling carries second impairment information. The second impairment information includes OSNR parameters of residual wavelengths at the intermediate node after the wavelength deletion.

The node B continues to send signaling to C. The signaling carries second impairment information. The second impairment information includes physical impairment parameters of $\lambda 1$ and $\lambda 13$ at the node B.

S306: The destination node receives the signaling, updates the OSNR parameters of the residual wavelengths at the intermediate node to OSNR parameters of the residual wavelengths at the destination node, judges whether the OSNR parameters of the residual wavelengths at the destination node exceed the preset range, and when the residual wavelengths include a wavelength whose OSNR parameter does not exceed the preset range, determines a wavelength from the wavelength whose OSNR parameter does not exceed the preset range as a wavelength used for establishing a path.

In this step, a node C stores an OSNR impairment value between the node B and the node C and an OSNR impairment value of the node C. After the signaling reaches the node C, the node C updates the OSNR parameters of the residual wavelengths at the node B to OSNR parameters of the residual wavelengths at the node C according to the OSNR impairment value between the node B and the node C, and the OSNR impairment value of the node C. In this step, the OSNR parameters of the residual wavelengths $\lambda 1$ and $\lambda 13$ at the node C are respectively OSNR $(\lambda 1)=14$ db and OSNR $(\lambda 13)=17$ db. At this time, the OSNR of the $\lambda 1$ is lower than a threshold value 14 db, so that at the node C, only the $\lambda 13$ is selected as a wavelength assigned to the path.

Figure 4:
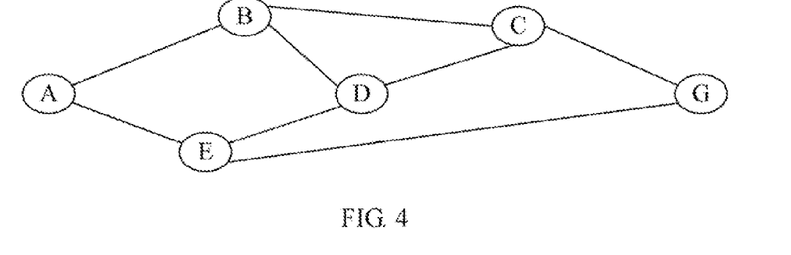
FIG. 4 is a network topology diagram adopting a method for transmitting impairment information according to a third embodiment of the present invention.

FIG. 4 is a network topology diagram adopting a method for transmitting impairment information according to a third embodiment of the present invention. In addition to the five nodes: A, B, C, D, and E in FIG. 2, the network further includes nodes F and G. In this embodiment, since an OSNR parameter decreases in a transmission process along a path, an OSNR parameter of a wavelength at a node is larger than that at a next hop node of the node. Since the decrease of the OSNR parameter in the transmission process along the path is determined by a characteristic of optical transmission, which is not described in detail here.

Figure 5:
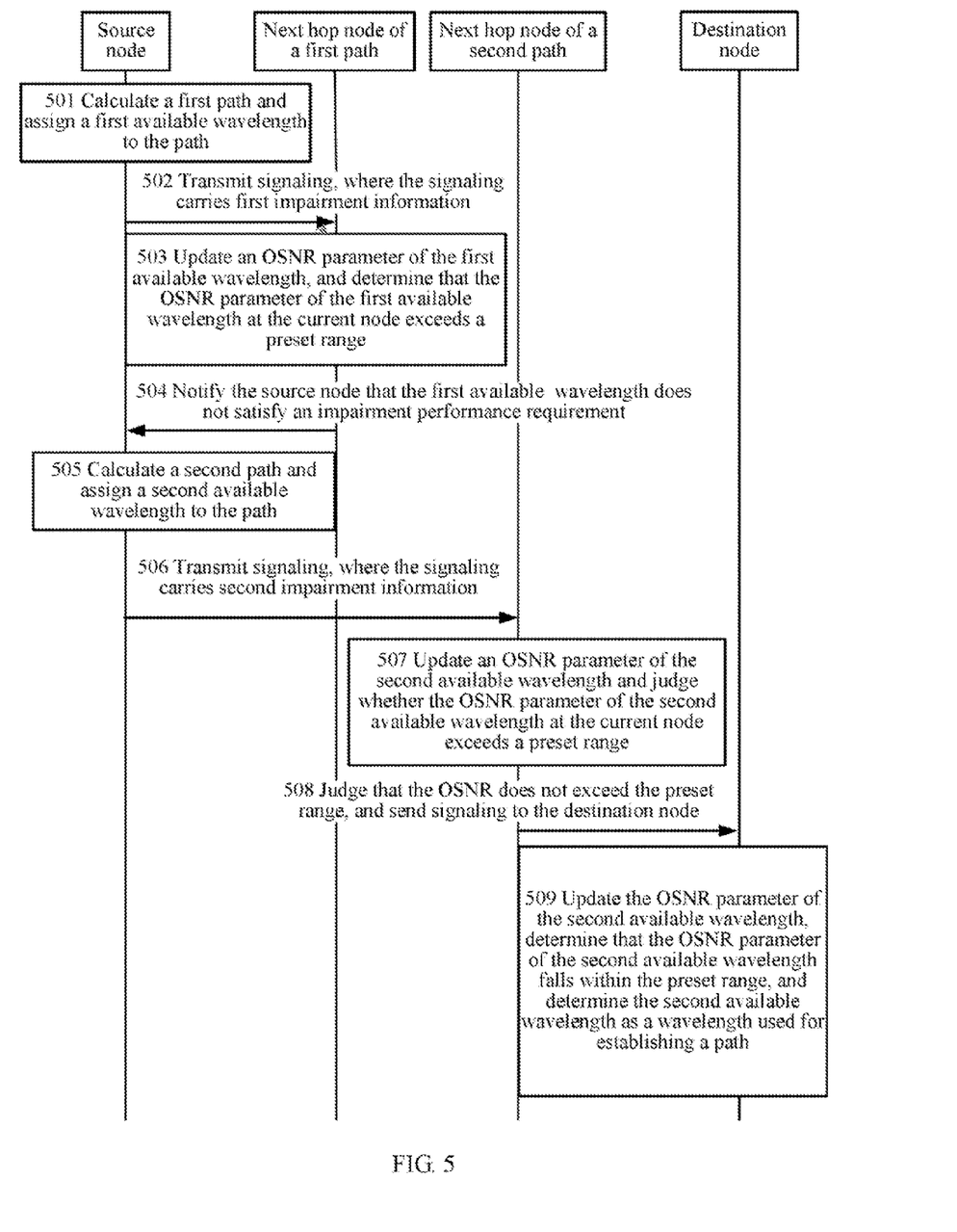
FIG. 5 is a flow chart of a method for transmitting impairment information according to the third embodiment of the present invention.

FIG. 5 is a flow chart of a method for transmitting impairment information according to the third embodiment of the present invention, which is specifically as follows.

S501: A source node calculates a first path according to a network topology condition, and assigns a first available wavelength to the path.

In this step, a source node A calculates a path A-B-C-G according to the network topology condition, and assigns an available wavelength $\lambda 5$ to the path.

S502: The source node sends out signaling and transmits the signaling along the first path. The signaling carries first impairment information. The first impairment information includes an OSNR parameter of the first available wavelength at the source node.

In this step, the source node A sends signaling and transmits the signaling along the path A-B-C-G. The signaling carries first impairment information. The first impairment information includes an OSNR parameter of the $\lambda 5$ at the source node A.

S503: A next hop node of the source node on the first path receives the signaling, updates the first impairment information, where the OSNR parameter of the first available wavelength at the source node is updated to an OSNR parameter of the first available wavelength at a current node, and determines that the OSNR parameter of the first available wavelength at the current node exceeds a preset range.

In this step, a node B stores an OSNR impairment value between the node A and the node B, and stores an OSNR impairment value of the node B. The node B receives the signaling, updates the OSNR parameter of the $\lambda 5$ at the node A to an OSNR parameter of the $\lambda 5$ at the node B according to the stored OSNR impairment value between the node A and the node B, and the OSNR impairment value of the node B, determines that OSNR $(\lambda 5)=14$ db at the node B, and judges whether the OSNR parameter of the $\lambda 5$ exceeds the preset range. It is assumed that the preset range in this embodiment is not less than 14 db, which represents that a permitted minimum value of the OSNR parameter of the wavelength on the path is 14 db when a signal transmitted on the wavelength on the path satisfies a signal quality requirement.

S504: The next hop node of the source node on the first path notifies the source node through signaling that the first available wavelength does not satisfy an impairment performance requirement, and the source node recalculates a path.

The node B judges that the OSNR of the $\lambda 5$ is lower than a threshold, and the node B notifies the source node A through signaling that the wavelength does not satisfy the impairment performance requirement: and the source node A recalculates a path.

S505: The source node calculates a second path, and assigns a second available wavelength to the calculated second path.

In this step, the source node A recalculates a path, where the recalculated path is A-E-G, and assigns an available wavelength $\lambda 1$ to the recalculated path.

S506: The source node sends out signaling and transmits the signaling along the second path, the signaling carries second impairment information, and the second impairment information includes an OSNR parameter of the second available wavelength at the source node.

In this step, the source node A sends out signaling and transmits the signaling along the path A-E-G, the signaling carries second impairment information, and the second impairment information includes an OSNR parameter of the $\lambda 1$ at the source node A.

S507: A next hop node of the source node on the second path receives the signaling, updates the second impairment information, where the OSNR parameter of the second available wavelength at the source node is updated to an OSNR parameter of the second available wavelength at the current node, and judges whether the OSNR parameter of the second available wavelength at the current node exceeds a preset range.

In this step, a node E stores an OSNR impairment value between the node A and the node E, and stores an OSNR impairment value of the node E. The node E receives the signaling, updates the OSNR parameter of the fl at the node A to an OSNR parameter of the $\lambda 1$ at the node E according to the stored OSNR impairment value between the node A and the node E, and the OSNR impairment value of the node E, determines that the OSRN parameter OSNR $(\lambda 1)=20$ db at the node E, and judges whether the OSNR parameter of the $\lambda 1$ at the node E exceeds the preset range.

Since an OSNR parameter decreases in a transmission process along a path, the OSNR parameter of the $\lambda 1$ at the source node A is larger than the OSNR parameter of the $\lambda 1$ at the node E. Since the decrease of the OSNR parameter in the transmission process along the path is determined by a characteristic of optical transmission, which is not a focus of the present invention, and is not discussed in detail here. In this step, the node E judges that the OSNR of the $\lambda 1$ at the node E does not exceed the preset range.

S508: When the next hop node of the source node on the second path judges that the OSNR of the second available wavelength at the next hop node does not exceed the preset range, signaling is sent to a destination node at a next hop of the current node. The signaling carries third impairment information. The third impairment information includes an OSNR parameter of the second available wavelength at the current node.

In this step, the node E judges that the OSNR of the $\lambda 1$ at the node E does not exceed the preset range. The node E sends signaling to a node G. The signaling carries third impairment information. The third impairment information includes the OSNR parameter of the $\lambda 1$ at the note E. In order to simplify description here, it is assumed that the next hop node of the node E is the destination node, and in practice, multiple intermediate nodes may exist.

S509: The destination node receives the signaling, updates the third impairment information, where the OSNR parameter of the second available wavelength at the next hop node of the source node, where the OSNR parameter of the second available wavelength at the next hop node of the source node is included in the third impairment information, is updated to an OSNR parameter of the second available wavelength at the destination node, and determines that the OSNR parameter of the second available wavelength at the destination node falls within the preset range. The destination node determines the second available wavelength as a wavelength used for establishing a path.

In this step, a node G stores an OSNR impairment value between the node E and the node G, stores an OSNR impairment value of the node G. The node G receives the signaling; updates the OSNR parameter of the λ1 at the node E to an OSNR parameter of the λ1 at the node G according to the stored OSNR impairment value between the node E and the node G, and the OSNR impairment value of the node G, determines that the OSNR parameter of the λ1 at the node G, OSNR (λ1)=18 db, and the OSNR value falls within the preset range. The node G determines the λ1 as a wavelength used for establishing a path.

Through the technical solution described in this embodiment of the present invention, When available wavelengths received by a first node include a wavelength whose physical impairment parameter exceeds a preset range, the wavelength is deleted and a physical impairment parameter of a residual wavelength is sent to a next hop node through second impairment information, so as to avoid a situation that when a physical impairment parameter of an available wavelength no longer meets a requirement of a physical impairment parameter threshold, impairment information of the available wavelength is still carried to a destination node, and therefore, the amount of redundant information may be reduced and a path establishment delay may be shortened.

Figure 6:
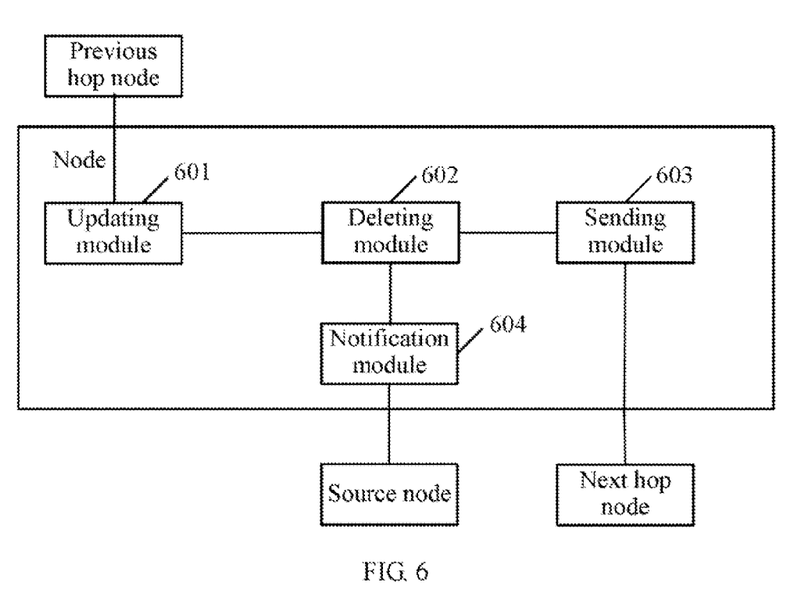
FIG. 6 is a structural diagram of a node according to a fourth embodiment of the present invention.

FIG. 6 is a structural diagram of a node according to a fourth embodiment of the present invention. The node includes:

an updating nodule 601, configured to receive first impairment information from a previous hop node of a current node, where the first impairment information includes a physical impairment parameter of one or more available wavelengths at the previous hop node; update the first impairment information, where physical impairment parameters of all or a part of available wavelengths of the one or more available wavelengths at the previous hop node are updated to physical impairment parameters of the all or a part of available wavelengths at the current node, where the physical impairment parameters of the all or a part of available wavelengths of the one or more available wavelengths at the previous hop node are included in the first impairment information;

a deleting module 602, configured to judge whether the physical impairment parameters of the all or a part of available wavelengths at the current node exceed a preset range; and when the all or a part of available wavelengths include a wavelength whose physical impairment parameter at the current node exceeds the preset range, delete the wavelength whose physical impairment parameter exceeds the preset range; and a sending module 603, configured to send second impairment information to a next hop node of the current node when the all or a part of available wavelengths still include a residual wavelength after the deleting module 602 deletes the wavelength, where the second impairment information includes a physical impairment parameter of the residual wavelength.

The node in the fourth embodiment may further include:

a notification module 604, configured to, when the all or a part of available wavelengths no longer include a residual wavelength after the deleting module 602 deletes the wavelength, notify a source node of a path on which the current node is located, so that the source node assigns another one or more available wavelengths to the path; or, when the all or a part of available wavelengths no longer include a residual wavelength after the deleting module 602 deletes the wavelength, notify the source node, so that the source node recalculates a path and assigns another one or more available wavelengths to the recalculated path.

Through the technical solution described in this embodiment of the present invention, when available wavelengths received by a node include a wavelength whose physical impairment parameter exceeds a preset range, the wavelength is deleted and a physical impairment parameter of a residual wavelength is sent to a next hop node through second impairment information, so as to avoid a situation that when a physical impairment parameter of an available wavelength no longer meets a requirement of a physical impairment parameter threshold, impairment information of the available wavelength is still carried to a destination node, and therefore, the amount of redundant information may be reduced and a path establishment delay may be shortened.

Figure 7:
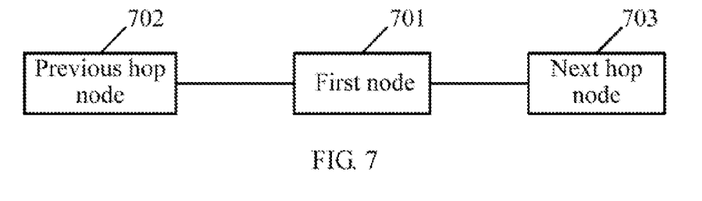
FIG. 7 is a structural diagram of a network system according to a fifth embodiment of the present invention.

FIG. 7 is a structural diagram of a network system according to a fifth embodiment of the present invention. The network system includes a first node 701, a previous hop node 702 of the first node, and a next hop node 703 of the first node.

The first node 701 is configured to: receive first impairment information from the previous hop node 702 of the first node 701, where the first impairment information includes a physical impairment parameter of one or more available wavelengths at the previous hop node 702;

update the first impairment information, where physical impairment parameters of all or a part of available wavelengths of the one or more available wavelengths at the previous hop node 702 are updated to physical impairment parameters of the all or a part of available wavelengths at the first node 701, where the physical impairment parameters of the all or a part of available wavelengths of the one or more available wavelengths at the previous hop node 702 are included in the first impairment information;

judge whether the physical impairment parameters of the all or a part of available wavelengths at the first node 701 exceed a preset range;

when the physical impairment parameters of the all or a part of available wavelengths include a wavelength whose physical impairment parameter at the first node 701 exceeds a preset range, delete the wavelength whose physical impairment parameter at the first node 701 exceeds the preset range; and when the all or a part of available wavelengths still include a residual wavelength after the wavelength deletion, send second impairment information to the next hop node 703 of the first node 701, where the second impairment information includes a physical impairment parameter of the residual wavelength.

The previous hop node 702 of the first node 701 may be a source node of the path. The one or more available wavelengths are assigned by the source node.

The next hop node 703 of the first node 701 may be a destination node of the path. The destination node is configured to receive the second impairment parameter, update the physical impairment parameter of the residual wavelength at the first node to physical impairment information of the residual wavelength at the destination node, judge whether the physical impairment parameter of the residual wavelength at the destination node exceeds a preset range, and when the residual wavelength includes a wavelength whose physical impairment parameter does not exceed the preset range, determine a wavelength from the wavelength whose physical impairment parameter does not exceed the preset range as a wavelength used for establishing a path.

Through the technical solution described in this embodiment of the present invention, when available wavelengths received by a first node include a wavelength whose physical impairment parameter exceeds a preset range, the wavelength is deleted and a physical impairment parameter of a residual wavelength is sent to a next hop node through second impairment information, so as to avoid a situation that when a physical impairment parameter of an available wavelength no longer meets a requirement of a physical impairment parameter threshold, impairment information of the available wavelength is still carried to a destination node, and therefore, the amount of redundant information may be reduced and a path establishment delay may be shortened.

Persons of ordinary skills in the art may understand that all or a part of the processes of the method in the preceding embodiments may be implemented by a program instructing relevant hardware. The program may be stored in a computer readable storage medium. When the program runs, the processes of the method in the preceding embodiments are performed. The storage medium may be a magnetic disk, an optical disk, a Read-Only Memory (Read-Only Memory, ROM), or a Random Access Memory (Random Access Memory, RAM).

The preceding descriptions are merely exemplary embodiments of the present invention, but are not intended to limit the protection scope of the present invention. The specification as a whole is used to support the protection scope of the present invention.

What is claimed is:

1. A method for transmitting impairment information, comprising:
    receiving, by a first node on a path, first impairment information from a previous hop node of the first node, wherein the first impairment information comprises a physical impairment parameter of one or more available wavelengths at the previous hop node;
    updating, by the first node, the first impairment information, wherein physical impairment parameters of all or a part of available wavelengths of the one or more available wavelengths at the previous hop node are updated to physical impairment parameters of the all or a part of available wavelengths at the first node, wherein the physical impairment parameters of the all or a part of available wavelengths of the one or more available wavelengths at the previous hop node are comprised in the first impairment information;
    judging, by the first node, whether the physical impairment parameters of the all or a part of available wavelengths at the first node exceed a preset range;
    when the all or a part of available wavelengths comprise a wavelength whose physical impairment parameter at the first node exceeds the preset range, deleting the wavelength whose physical impairment parameter at the first node exceeds the preset range; and
    when the all or a part of available wavelengths still comprise a residual wavelength after the wavelength whose physical impairment parameter at the first node exceeds the preset range is deleted, sending, by the first node, second impairment information to a next hop node of the first node, wherein the second impairment information comprises a physical impairment parameter of the residual wavelength at the first node.

2. The method according to claim 1, wherein the updating, by the first node, the physical impairment parameters of the all or a part of available wavelengths of the one or more available wavelengths at the previous hop node to the physical impairment parameters of the all or a part of available wavelengths at the first node comprises:
    updating, by the first node, the physical impairment parameter of the one or more available wavelengths at the previous hop node to an intermediate physical impairment parameter of the one or more available wavelengths according to a physical impairment value between the previous hop node and the first node; and
    updating, by the first node, the intermediate physical impairment parameter of the one or more available wavelengths to the physical impairment parameter of the one or more available wavelengths at the first node according to a physical impairment value of the first node.

3. The method according to claim 1, wherein the updating, by the first node, the physical impairment parameters of the all or a part of available wavelengths of the one or more available wavelengths at the previous hop node to the physical impairment parameters of the all or a part of available wavelengths at the first node comprises:
    updating, by the first node, the physical impairment parameter of the one or more available wavelengths at the previous hop node to an intermediate physical impairment parameter of the one or more available wavelengths according to a physical impairment value between the previous hop node and the first node;
    judging, by the first node, whether the intermediate physical impairment parameter of the one or more available wavelengths exceed the preset range;
    when the one or more available wavelengths comprise a wavelength whose intermediate physical impairment parameter exceeds the preset range, deleting the wavelength whose intermediate physical impairment parameter exceeds the preset range to obtain a wavelength whose intermediate physical impairment parameter falls within the preset range; and
    updating an intermediate physical impairment parameter of the wavelength whose intermediate physical impairment parameter falls within the preset range to a physical impairment parameter of the wavelength at the first node according to a physical impairment value of the first node, wherein the intermediate physical impairment parameter of the wavelength falls within the preset range.

4. The method according to claim 1, wherein
    the previous hop node of the first node is a source node of the path, and the one or more available wavelengths are assigned by the source node.

5. The method according to claim 1, wherein the next hop node of the first node is a destination node of the path, and after the first node sends the second impairment information to the destination node, the destination node updates the physical impairment parameter of the residual wavelength at the first node to a physical impairment parameter of the residual wavelength at the destination node, judges whether the physical impairment parameter of the residual wavelength at the destination node exceeds the preset range, and when the residual wavelength comprises a wavelength whose physical impairment parameter does not exceed the preset range, determines a wavelength from the wavelength whose physical impairment parameter does not exceed the preset range as a wavelength used for establishing a path.

6. The method according to claim 1, wherein
when the all or a part of available wavelengths no longer comprise a residual wavelength after the wavelength whose physical impairment parameter at the first node exceeds the preset range is deleted, the first node notifies a source node of the path, and the source node assigns another one or more available wavelengths to the path.

7. The method according to claim 1, wherein
when the all or a part of available wavelengths no longer comprise a residual wavelength after the wavelength whose physical impairment parameter at the first node exceeds the preset range is deleted, the first node notifies a source node of the path, and the source node recalculates a path and assigns another one or more available wavelengths to the recalculated path.

8. A node, comprising:
an updating module, configured to receive first impairment information from a previous hop node of a current node, wherein the first impairment information comprises a physical impairment parameter of one or more available wavelengths at the previous hop node; update the first impairment information, wherein physical impairment parameters of all or a part of available wavelengths of the one or more available wavelengths at the previous hop node are updated to physical impairment parameters of the all or a part of available wavelengths at the current node, wherein the physical impairment parameters of the all or a part of available wavelengths of the one or more available wavelengths at the previous hop node are comprised in the first impairment information;
a deleting module, configured to judge whether the physical impairment parameters of the all or a part of available wavelengths at the current node exceed a preset range; and when the all or a part of available wavelengths comprise a wavelength whose physical impairment parameter at the current node exceeds the preset range, delete the wavelength whose physical impairment parameter at the current node exceeds the preset range; and
a sending module, configured to send second impairment information to a next hop node of the current node when the all or a part of available wavelengths still comprise a residual wavelength after the deleting module deletes the wavelength whose physical impairment parameter at the current node exceeds the preset range, wherein the second impairment information comprises a physical impairment parameter of the residual wavelength at the current node.

9. The method according to claim 8, further comprising:
a notification module, configured to, when the all or a part of available wavelengths no longer comprise a residual wavelength after the deleting module deletes the wavelength, notify a source node of a path on which the current node is located, so that the source mode assigns another one or more available wavelengths to the path, or when the all or a part of available wavelengths no longer comprise a residual wavelength after the deleting module deletes the wavelength, notifies the source node, so that the source node recalculates a path and assigns another one or more available wavelengths to the recalculated path.

10. A network system, comprising a first node, a previous hop node of the first node, and a next hop node of the first node, wherein
the first node is configured to: receive first impairment information from the previous hop node of the first node, wherein the first impairment information comprises a physical impairment parameter of one or more available wavelengths at the previous hop node;
update the first impairment information, wherein physical impairment parameters of all or a part of available wavelengths of the one or more available wavelengths at the previous hop node are updated to physical impairment parameters of the all or a part of available wavelengths at the first node, wherein the physical impairment parameters of the all or a part of available wavelengths of the one or more available wavelengths at the previous hop node are comprised in the first impairment information;
judge whether the physical impairment parameters of the all or a part of available wavelengths at the first node exceed a preset range;
when the all or a part of available wavelengths comprise a wavelength whose physical impairment parameter at the first node exceeds the preset range, delete the wavelength whose physical impairment parameter at the first node exceeds the preset range; and
when the all or a part of available wavelengths still comprise a residual wavelength after the wavelength whose physical impairment parameter at the first node exceeds the preset range is deleted, send second impairment information to the next hop node of the first node, wherein the second impairment information comprises a physical impairment parameter of the residual wavelength at the first node.

11. The system according to claim 10, wherein
the previous hop node of the first node is a source node of the path, and the one or more available wavelengths are assigned by the source node.

12. The system according to claim 10, wherein the next hop node of the first node is a destination node of the path, and the destination node is configured to receive the second impairment parameter, update the physical impairment parameter of the residual wavelength at the first node to physical impairment information of the residual wavelength at the destination node, judge whether the physical impairment parameter of the residual wavelength at the destination node exceeds a preset range, and when the residual wavelength comprises a wavelength whose physical impairment parameter does not exceed the preset range, determine a wavelength form the wavelength whose physical impairment parameter does not exceed the preset range as a wavelength used for establishing a path.

* * * * *